United States Patent [19]

Louis et al.

[11] E Re. 30,226

[45] Reissued Mar. 11, 1980

[54] TORQUE LIMITING CONTROL

[75] Inventors: Joseph E. Louis, Ames; Roger D. Cannell, Nevada, both of Iowa

[73] Assignee: Sundstrand Corporation, Rockford, Ill.

[21] Appl. No.: 814,798

[22] Filed: Jul. 11, 1977

Related U.S. Patent Documents

Reissue of:

[64] Patent No.: 3,941,514
Issued: Mar. 2, 1976
Appl. No.: 471,573
Filed: May 20, 1974

[51] Int. Cl.[2] ..... F04B 49/00

[52] U.S. Cl. ..... 417/216; 417/222

[58] Field of Search ..... 417/216, 222, 426, 428, 417/218; 91/506; 60/445, 452, 486

[56] References Cited

U.S. PATENT DOCUMENTS

| | | | |
|---|---|---|---|
| 3,017,750 | 1/1962 | Kempson | 417/218 |
| 3,093,081 | 6/1963 | Budzich | 417/216 |
| 3,232,238 | 2/1966 | Faisander | 417/212 |
| 3,302,585 | 2/1967 | Adams et al. | 417/222 |
| 3,510,231 | 5/1970 | Bobst | 417/218 |
| 3,637,327 | 1/1972 | Kubiak | 417/222 |
| 3,669,570 | 6/1972 | Himmler | 417/222 |
| 3,723,026 | 3/1973 | Soyland et al. | 417/216 |
| 3,732,036 | 5/1973 | Busbey et al. | 417/216 |

FOREIGN PATENT DOCUMENTS

| | | | |
|---|---|---|---|
| 1453586 | 10/1964 | Fed. Rep. of Germany | 417/216 |
| 1922269 | 11/1970 | Fed. Rep. of Germany | 417/216 |
| 1212609 | 11/1970 | United Kingdom | 417/216 |

*Primary Examiner*—Carlton R. Croyle
*Assistant Examiner*—Thomas I. Ross
*Attorney, Agent, or Firm*—Wegner, Stellman, McCord, Wiles & Wood

[57] ABSTRACT

A torque limiting control for a pair of variable displacement hydraulic pumps having displacement varying means and servo means including springs urging each of the displacement varying means to a position for maximum pump displacement and fluid operated means acting in opposition to the springs to shift said displacement varying means for reduction in pump displacement, said control including means for summing the fluid pressures generated by both pumps and controlling the servo means for the two pumps to progressively move the displacement varying means for reduction of pump displacement as the sum of the fluid pressures rises above a predetermined value at a certain pump displacement and thereby limit the sum of the torques required by said pumps.

3 Claims, 3 Drawing Figures

CONTROL VALVE
CONTROL VALVE
SWASHPLATE
SWASHPLATE
INPUT
10
11
15
16
17
18
20
21
25
26
27
28
30
31
32
33
34
40
41
42
43
44
50
51
52
53
54
55
56
57
60
61
62
63
64
65
66
67
70
71
74
75
76
77
78
79
81
84
86
90
91
92
95
97
100
101
102
110
111

TORQUE LIMITING CONTROL

Matter enclosed in heavy brackets [ ] appears in the original patent but forms no part of this reissue specification; matter printed in italics indicates the additions made by reissue.

BACKGROUND OF THE INVENTION

This invention pertains to torque limiting controls for a plurality of variable displacement hydraulic pumps. The sum of the torques required by said pumps is determined by sensing the sum of the pressures generated by both pumps. The strokes of the hydraulic pumps are reduced when the sum of the pressures exceeds a predetermined value for a predetermined displacement of the pumps. Such a torque limiting control is of particular utility wherein large volumes of oil are supplied to reduce cycle time for operations performed by fluid operated motors but it is not practical to supply enough power to keep this flow at high pressure. By the control disclosed herein, high pressure can be developed at lower flows reducing the power required to drive the pumps and with the reduction in flow of the pumps occurring as the sum of the pump loads equals the power available for driving the pumps.

SUMMARY

In operating two separate hydraulic circuits from a common prime mover, it is desirable to limit the sum of the torques required by the pumps of the two circuits to a predetermined value and, thus, limit the torque required by the hydraulic pumps to that available from the prime mover. Each of the hydraulic circuits has a variable displacement hydraulic pump and a primary feature of the control is to provide a means for summing the pressures generated by the two pumps and equally reducing the displacement of the pumps as the sum of the pressures progressively rises above a certain value for a particular rate of displacement in order to limit the torque required by the two circuits. Thus, a relation between pump pressures and displacements is maintained to have control of the total torque required by the pumps.

More particularly, the control for the displacement of the pumps operates to reduce displacement of both pumps equally at approximately the same rate even though the pressures generated by the two pumps are not equal. With such a control, two separate functions can be caused to slow down in phase, which is desirable for driven devices such as a dual-track vehicle wherein there is a hydraulic drive circuit associated with each track and wherein, if one track becomes stalled, the other track will also stop. As another example, one hydraulic circuit could drive a propulsion system and the other circuit could drive an elevator (conveyor) of an excavator.

A particular feature of the invention is to provide a torque-limiting control for a pair of axial piston hydraulic pumps each in circuit with their respective motor and with servo means for varying the position of the swashplates and, therefore, the displacement of the pumps with said control including a pair of control valves associated one with each pump for controlling the delivery of pressure to the servo means in response to a sum of the pressures delivered by both pumps. A feedback means associated with each pump swashplate and the associated control valve operates to feed back the angle of the swashplate (and thus pump displacement) to the control valve and also bring the control valve and swashplate to an equilibrium condition. The swashplates of both pumps adjust to the same angle even though the pressures generated by the two pumps are of different values.

DESCRIPTION OF THE PREFERRED EMBODIMENT

Figure 1:
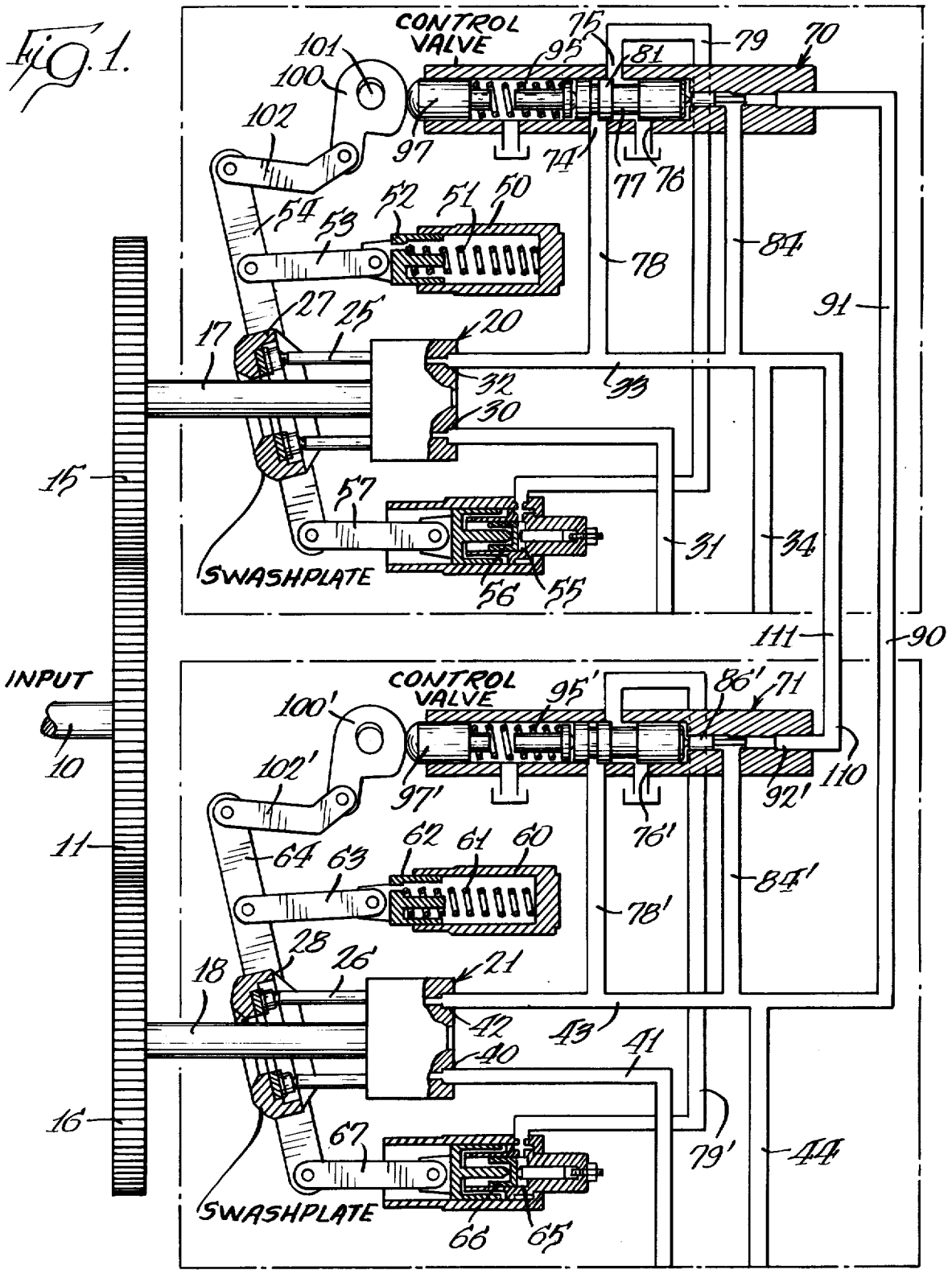
FIG. 1 is a diagrammatic view of a portion of two hydraulic circuits with parts of the pumps broken away and with parts shown in section.

A pair of hydraulic circuits are shown partially in FIG. 1 wherein each circuit includes a variable displacement hydraulic pump delivering fluid under pressure to a motor (not shown) and with the two pumps being driven from a common prime mover. Although two circuits are illustrated, it will be obvious that two or more circuits and, therefore, two or more pumps can be driven from the same prime mover and with the control applied thereto to limit the torque required by the circuits.

As shown in FIG. 1, a shaft 10 driven from a prime mover, such as the engine of a crawler-type tractor, has a gear 11 engaging gears 15 and 16 on pump drive shafts 17 and 18, respectively, for driving the cylinder block of a pair of variable displacement hydraulic pumps, indicated generally at 20 and 21. As shown, the pumps are of the axial piston type. Each of these pumps has a plurality of axially disposed pistons 25 and 26, respectively, which are stroked relative to the cylinder block of the pump during rotation of the block by swashplates 27 and 28, respectively, which constitute displacement varying means for the pumps. The pump 20 has an inlet 30 connected to a source of hydraulic fluid through a line 31 and an outlet 32 with a line 33 extending to a line 34 which connects to a motor (not shown). The pressure compensated pump delivers fluid under pressure through lines 33 and 34 to a motor with the flow of fluid to the motor being controlled by valve means (not shown) and with forward and reverse controls also being provided by control valving (not shown). The pump 21 has an inlet 40 connected to a source of fluid by a line 41 and an outlet 42 connecting to lines 43 and 44 corresponding to lines 33 and 34 of pump 20 for delivery of fluid to a motor (not shown).

The swashplates 27 and 28 are each shown at a maximum angle to provide for maximum displacement from the pumps. The position of the swashplate is controlled by servo means. For pump 20, one part of the servo means includes a cylinder 50 housing a spring 51 operable against a plunger 52 movable in the cylinder and which is connected by a link 53 to an arm 54 affixed to the swashplate 27. The spring 51 functions to urge the arm 54 and, therefore, the swashplate 27 to a maximum angle for maximum displacement from the pump. A second part of the servo means for the swashplate 27 includes a fluid cylinder 55 having a fluid pressure operated piston 56 therein which is connected by a link 57 to the arm 54. Delivery of fluid under pressure to the cylinder 55 exerts a force on the arm 54 in a direction opposite to the force exerted by the spring 51 and acts to move the swashplate to a reduced angle and toward a position to destroke the pistons 25 and reduce the flow from the pump 20.

The structure above described with respect to the pump 20 is the same for the pump 21 including a cylinder 60 having a spring 61 urging a plunger 62 outwardly and which is connected by a link 63 to an arm 64 secured to the swashplate 28. A fluid cylinder 65 has a piston 66 connected by a link 67 to the arm 64 to act in opposition to the spring 61.

Figure 2:
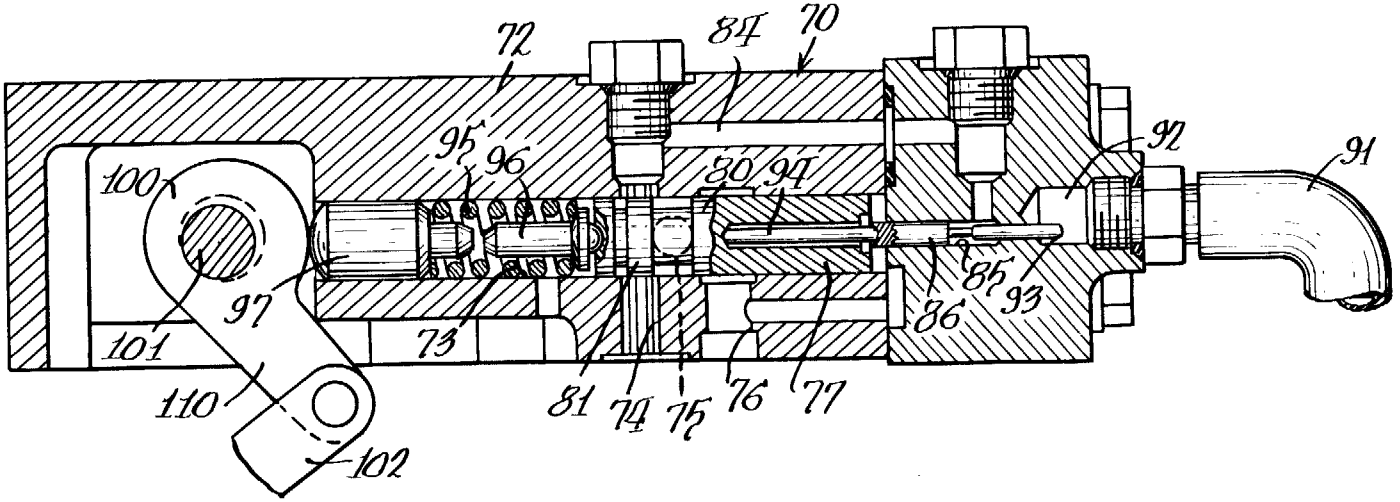
FIG. 2 is a vertical, longitudinal, central section of a control valve for one of the pumps.

The control for limiting torque operates in response to a sum of the pressures generated by the pumps 20 and 21 at any particular pump displacement. The control includes a pair of control valves 70 and 71 shown diagrammatically in FIG. 1 in their positions when the swashplates are at their maximum angle for maximum displacement from the pumps. Each of these valves is of the same construction, with the valve being shown more particularly in FIG. 2. The control valve components are positioned as shown in FIG. 2 when the swashplate is at a minimum displacement position. The control valve 70 will be described particularly and, as shown in FIG. 2, this valve has a housing 72 with a bore 73 having a pressure port 74, a servo port 75 and a drain port 76 communicating with said bore and said communication therebetween controlled by a valve member 77 movable in the bore. The pressure port 74 is supplied with pressure from the outlet 32 of the pump 20 by a line 78 extending from the line 33. The servo port 35 connects to the servo cylinder 55 through a line 79. In maximum displacement position of the swashplate 27, the servo port 75 communicates with the drain port 76 as permitted by the position of a land 80 on the valve member 77. At the same time, a land 81 blocks communication between the pressure port 74 and the servo port 75. In this position of the control valve, pressure is not directed to the servo cylinder 55 with the result that the spring 51 is effective to maintain the swashplate 27 at its maximum angle position for maximum displacement from the pump.

For control valve 70, the pressure generated by pump 20 is directed from the pressure port 74 through a passage 84 in the valve housing (shown diagrammatically in FIG. 1) for delivery to a chamber 85 housing a piston 86. The piston 86 has a step whereby a pressure-responsive differential area is provided to have the pressure of pump 20 act on the piston 86 in a direction to move the piston toward the left, as viewed in FIG. 2. Additionally, pressure generated by the pump 21 is applied to the piston 86 through an interconnect line 90 between the two hydraulic circuits and which extends between the line 43 leading from the outlet of pump 21 and a line 91 connected into an end of the control valve 70. This pressure signal is delivered to a chamber 92 where it acts upon an end 93 of the piston 86. This defines a second pressure-responsive area whereby the piston 86 functions to sum the pressures generated by the pumps of both circuits. The force generated as a result of application of pressure to the pressure-responsive areas tends to move the piston 86 toward the left, as viewed in FIG. 2, and against a pin 94. The pin 94 extends into an opening in the end of the valve member 77 to provide a loose connection to avoid transmission of lateral forces from the piston 86 to the valve member. The force applied through the pin 94 to the valve member 77 acts in a direction to shift the valve member 77 toward the left and against the force of a spring 95 positioned within the bore 73. The spring 95 is engaged between a spring guide 96 movable in the bore and engageable against the left-hand end of the valve member and a movable piston 97 forming part of a feedback means to be described.

The spring 95 is shown under maximum loading in FIG. 2 and with minimal loading in FIG. 1. Referring to FIG. 1, the initial force of the spring 95 is established to determine the threshold value of the sum of pressures from the two pumps which will begin to reduce the displacement of the pumps by movement of the swashplates 27 and 28 from their maximum angle position.

Figure 3:
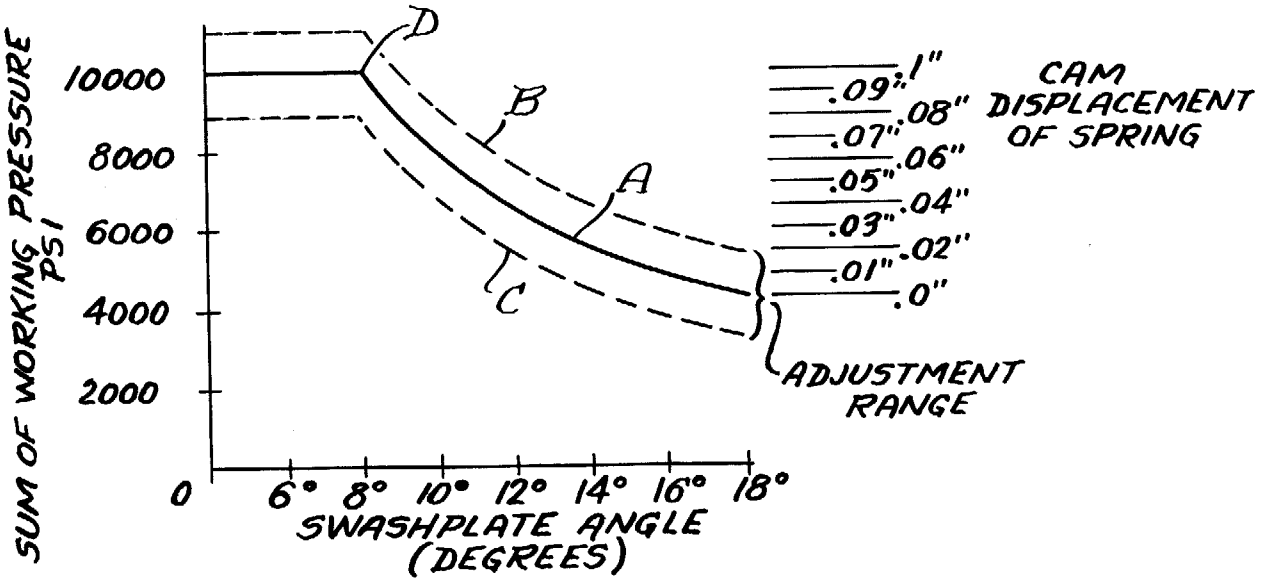
FIG. 3 is a graph showing the relation between pump displacement and the sum of working pressures for the two pumps of FIG. 1.

In FIG. 3, a graph of values for one particular system is shown wherein the abscissa represents swashplate angle from minimum pump displacement to maximum pump displacement with increasing angle of the swashplate and the ordinate represents the sum of working pressures for both pumps.

With the control valve 70 as shown in FIG. 1 positioned corresponding to the maximum angle of the swashplate 27, it will be seen that the sum of the working pressures of the two pumps will exceed 4,000 p.s.i., as indicated by the solid line A of the graph, before any adjustment of the swashplate angle occurs. As the pressure increases above this value, there will be forces created by the pressures acting on the piston 86 sufficient to shift the valve member 77 toward the left against the spring 95 and cause land 80 to block the servo port 75 from the drain port 76 and connect the servo port to the pressure port 74 whereby pressure delivered by the pump is applied to the servo motor 55.

Feedback means are provided in order to bring the system back to an equilibrium, including a cam 100 rotatable on an eccentrically-mounted pin 101 and having a peripheral cam surface operable on the piston 97 between the two extremes of rotatable movement of the cam, as shown in FIGS. 1 and 2. The position of the cam is controlled by the position of the swashplate and, more particularly, by connection of the arm 54 to the cam 100 through a pivotally interconnecting link 102. The eccentrically-mounted pin 101 can be rotated to shift the path of the cam 100 relative to the control valve to change the loading of the spring and result in an adjustment range for adjustment of the swashplate angle with respect to the sum of working pressures, as illustrated in the graph of FIG. 3. The gross adjustment range is indicated by an area lying between the broken lines B and C.

The feedback means functions to bring the system back to equilibrium whereby as the swashplate angle is reduced from that shown in FIG. 1, the cam 100 functions to increase the loading on the spring 95 to bring about a balance between the force of the spring urging the valve member 77 to the right and the forces created by pressure urging the valve member to the left. When balanced, other than at full displacement, the servo port 75 supplies adequate fluid to replace leakage to maintain a certain pressure in the servo cylinders 55 and 65. The maximum loading of the spring 95 resulting from positioning of the cam 100 and representing minimum swashplate angle is shown in FIG. 2.

Referring to FIG. 3, assume that the swashplates are positioned at 12° after destroking from full displacement. When the sum of pump pressures exceeds approximately 6600 p.s.i., there will be a further decrease in swashplate angle and, therefore, in pump displacement.

All of the structure of the control valve 70 and structure associated therewith is the same for control valve 71 and corresponding parts have been given the same reference numeral with a prime affixed thereto. The control valve 71 has the pressure generated by pump 21 applied to the stepped piston 86' through a passage 84' and with the pressure generated by pump 20 also applied to the piston at a chamber 92 by means of a line 110 connected to an end of the control valve 71 and having an interconnection 111 to the line 33 extending from the outlet of the pump 20. Control valve 71 also sums the pressures of the two pumps and, through delivery of fluid under pressure, to the servo motor 65 controls the position of the swashplate 28.

Inasmuch as both control valves 70 and 71 receive a pressure signal from both pumps, both pumps will change strokes at approximately the same rate and will reach the same adjusted displacement through the feedback means associated therewith, even though the pressures generated by the two pumps may be of different values. With the control disclosed herein, it will be recognized that in a crawler tractor vehicle with a pair of tracks each driven separately from a hydraulic circuit, the control would sense a rapid increase in pressure if one track were to become stalled which would function to destroke the pumps and, thus, result in also stopping the other track.

Each of the curves A, B, and C of the graph of FIG. 3 has a point, as point D, representing the point at which maximum loading is imposed upon the spring 95 of a control valve. This is shown by the legends indicating cam displacement of the spring as an ordinate at the right-hand side of the graph and with maximum cam displacement of the spring being indicated at the level of point D. The shape of the curve in defining the relationship of swashplate angle to the sum of working pressures can be varied by changing the geometry of cam 100.

We claim:

[1. A torque limiting control for a pair of variable displacement hydraulic pumps each having displacement varying means, comprising, means for urging each of said displacement varying means to a position for maximum pump displacement, fluid operated means operable to shift said displacement varying means against said urging means to reduce pump displacement, a first control valve responsive to the sum of the fluid pressures generated by both pumps for directing fluid pressure to said fluid operated means for one of the pumps, a second control valve responsive to the sum of the fluid pressures generated by both pumps for directing fluid pressure to said fluid operated means for the second of said pumps, and a pair of feedback means associated one with each of said control valves for feedback of the positioning of the pump displacement varying means.]

[2. A torque limiting control as defined in claim 1 wherein each of said control valves is connected to the outlet of the associated pump to provide a source of fluid pressure for direction to said fluid operated means.]

[3. A torque limiting control as defined in claim 1 wherein each of the control valves includes a housing having a bore with a pressure port, a drain port and a servo port communicating with said bore, a valve member in said bore urged to a position to connect said servo port with the drain port, a pair of pressure-responsive areas associated with said valve member for said summing of the fluid pressures generated by both of said pumps to move the valve member in a direction to close said drain port and open the servo port to said pressure port, and means connecting the servo port to said fluid operated means.]

[4. A torque limiting control as defined in claim 3 wherein a stepped piston has said two pressure-responsive areas and is disposed in end to end relation with the valve member.]

[5. A torque limiting control as defined in claim 4 wherein passage means in said housing connects said pressure port to one of said piston pressure-responsive areas, and a connecting line from one pump outlet to the other control valve and in communication with the second of said piston pressure-responsive areas.]

[6. A torque limiting control as defined in claim 3 wherein said valve member is urged to said position by a spring in said bore, and said feedback means includes a movable cam operable to progressively increase the force on said spring as the displacement varying means moves to reduce pump displacement.]

[7. A torque limiting control as defined in claim 6 including means to shift the path of movement of the cam relative to the valve member to vary the initial loading of said spring.]

8. A torque limiting control for a pair of variable displacement axial piston pumps each having a swashplate for controlling the stroke of the associated pump pistons, each of said pumps having a fluid inlet and a fluid pressure outlet for connection of said outlets to separate motors, servo means for positioning each of said swashplates including means urging said swashplates to a full stroke position and pressure-responsive means to position said swashplates at a position other than full stroke, and control means for summing the fluid pressures generated by said pumps and controlling said servo means to progressively move the swashplates from their full stroke positions as the sum of the pressures rises above a predetermined value to limit the sum of the torques delivered by said pumps including a pair of control valves *associated one with each of said pair of pumps and* with each control valve having a pressure port connected to the outlet of [an] *the* associated pump, each control valve having a housing with a bore, said pressure port, a drain port and a servo port communicating with said bore, a valve member in said bore, [urged] *spring means engaging the valve member for urging the valve member* to a position to connect said servo port with the drain port, a pair of pressure-responsive areas [associated with] *in coaxial relation with* said valve member *and said spring means* for said summing of the fluid pressures generated by both of said pumps to move the valve member *against the spring means* in a direction to close said drain port and open the servo port to said pressure port, [and] means connecting the servo port to said servo means whereby outlet pressure of a pump is applied to the servo means of the same pump for positioning the swashplate, *and a pair of feedback means associated one with each pump and control valve including a cam and cam follower with the cam positioned responsive to swashplate position and the cam follower acting in coaxial relation with the valve member and the spring means to modify the controlling action of the valve member.*

[9. A torque limiting control as defined in claim 8 wherein said valve member is urged to said position by a spring in said bore, and feedback means including a movable cam operable to progressively increase the force on said spring as the swashplate moves to reduce pump displacement.]

10. A torque limiting control as defined in claim [9] *11* including means to shift the path of movement of the cam relative to the valve member to vary the initial loading of said spring.

*11. A torque limiting control for a pair of variable displacement axial piston pumps each having a swashplate for controlling the stroke of the associated pump pistons, each of said pumps having a fluid inlet and a fluid pressure outlet for connection of said outlets to separate motors, servo means for positioning each of said swashplates including means urging said swashplates to a full stroke position and pressure-responsive means to position said swashplates at a position other than full stroke, and control means for summing the fluid pressures generated by said pumps and controlling said servo means to progressively move the swashplates from their full stroke positions as the sum of the pressures rises above a predetermined value to limit the sum of the torques delivered by said pumps including a pair of control valves associated one with each of said pair of pumps and with each control valve having a pressure port connected to the outlet of the associated pump, each control valve having a housing with a bore, said pressure port, a drain port and a servo port communicating with said bore, a valve member in said bore urged to a position to connect said servo port with the drain port, a pair of pressure-responsive areas provided by a stepped piston associated with and in coaxial relation with said valve member for said summing of the fluid pressures generated by both of said pumps to move the valve member in a direction to close said drain port and open the servo port to said pressure port, means connecting the servo port to said servo means whereby outlet pressure of a pump is applied to the servo means of the same pump for positioning the swashplate, said valve member being urged to said position by a spring in said bore, and feedback means including a movable cam operable to progressively increase the force on said spring as the swashplate moves to reduce pump displacement.*

* * * * *